April 29, 1969   J. P. RODRIGUEZ   3,441,044

PRESSURE ACTUATED FLUSH VALVE FOR FLUSHING MARINE ENGINES

Filed Feb. 23, 1967

INVENTOR.
JOSE PELAEZ RODRIGUEZ

BY Ernest H. Schmidt

ATTORNEY.

United States Patent Office

3,441,044
Patented Apr. 29, 1969

3,441,044
PRESSURE ACTUATED FLUSH VALVE FOR
FLUSHING MARINE ENGINES
Jose Pelaez Rodriguez, 650 NE. 61st St.,
Miami, Fla. 33137
Filed Feb. 23, 1967, Ser. No. 617,893
Int. Cl. F16k 15/02
U.S. Cl. 137—111                              6 Claims

ABSTRACT OF THE DISCLOSURE

A flush valve for connection in the inlet water conduit of a sea water cooled engine, having means for connection with a pressurized fresh water supply, and including a movable piston valve switching mechanism controlled by the pressure of the fresh water supply when connected thereto to direct fresh water through the engine for flushing out sea water.

---

This invention relates, generally, to water-cooled marine engines, and is directed particularly to a pressure-actuated flush valve for automatically flushing sea water from water-cooled marine engines with pressurized fresh water.

Inboard and so-called inboard-outboard internal combustion engines commonly used for propelling water craft ordinarily are water-cooled by forced circulation of water taken from and returned to the body of water upon which the craft is travelling. If the craft is in seat water, such water remaining in the engine block upon docking after a cruise, being corrosive and high in mineral content, has a tendency to form harmful deposits on the interior walls of the water jacket, thereby impairing cooling efficiency and eventually clogging the water jacket passages. While it is common knowledge that such damage can be minimized by flushing out the engine water jacket with fresh water each time the boat is left at dock or anchorage after use of the craft, such practice is neglected more often than not because of the trouble involved in manually turning valves and the like for directing water from a fresh water source of supply into the engine water jacket input conduit.

It is, accordingly, the principal object of this invention to provide a pressure-actuated flush valve that can be permanently connected in the inlet conduit of a sea-water cooled marine engine and which is adapted to be connected in communication with a conveniently located water hose fitting above deck for ready connection with a fresh water supply hose providing pressurized flushing water, whereby the engine can be flushed with minimum effort after each use of the craft.

It is a more particular object to provide a flush valve of the character described including a first inlet member and an outlet member, a passageway communicating between said inlet and outlet for the passage of sea water coolant into the engine water jacket, and a second inlet passageway including mechanism responsive to water under pressure applied to said second inlet for sealing off said first inlet and simultaneously directing the water under pressure through said outlet.

Another object is to provide a pressure-actuated flush valve of the character described which can be used irrespectively of whether the craft is in or out of water, and which therefore is convenient for use in cooling a marine engine when running out of water for tune-up purposes and the like while in drydock or otherwise removed from the water.

Yet another object of the invention is to provide a pressure-actuated flush valve of the character described that can readily be disassembled for repair or replacement of parts, and wherein the mechanism of which can readily be adjusted or changed to enable dependable flushing operation with a wide range of input water pressures.

Another object is to provide a pressure-actuated flush valve of the character described which will be simple in construction, fool-proof in operation, inexpensive to manufacture and longwearing in use.

Other objects, features and advantages of the invention will be apparent from the following description when read with reference to the accompanying drawings. In the drawings, wherein like reference numerals denote corresponding parts throughout the several views.

Figure 1:
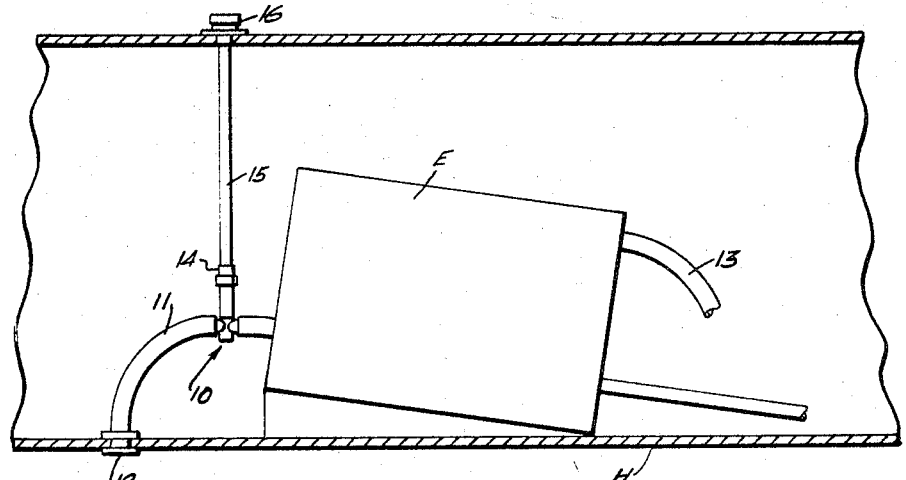
FIG. 1 is a partial vertical section of a boat hull showing an inboard motor in block form equipment with a pressure actuated valve embodying the invention.

Referring now in detail to the drawings, the numeral 10 designates a pressure actuated flush valve embodying my invention, the same being shown in FIG. 1 connected in series with the cooling water inlet conduit 11 leading to a marine engine E. The inlet conduit 11 supplies sea water through an inlet fitting 12 in the bottom of the hull H of the boat for circulation through the water jacket of the marine engine for cooling. After circulating through the engine, the water passes through outlet conduit 13 to be discharged back into the water.

The flush valve 10 in a typical installation is provided with a fresh water inlet nipple 14 by means of which connection can be made, through a conduit 15, to a hose connector 16 conveniently located in the deck or gunwale of the boat for connection of a fresh water supply hose in the manner and for the purpose hereinafter described.

Figure 2:
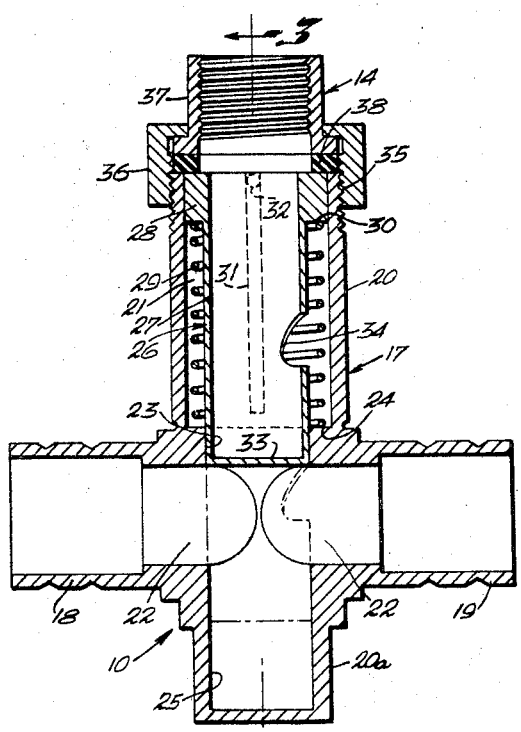
FIG. 2 is a vertical cross-sectional view of the flush valve, shown separately and on an enlarged scale.
Figure 3:
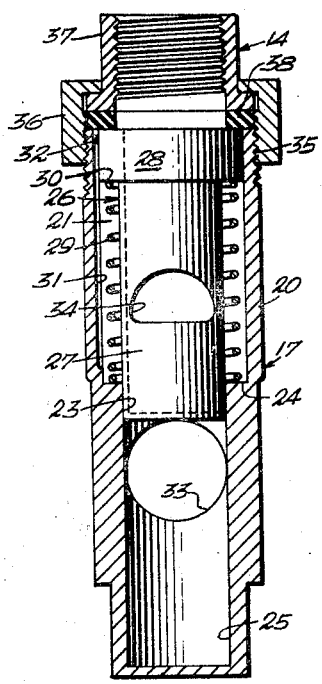
FIG. 3 is a longitudinal cross-sectional view taken along the line 3—3 on FIG. 2 in the direction of the arrows.

Referring now to FIGS. 2 and 3 of the drawings, the flush valve 10 comprises a T-shaped housing 17 which may be cast of brass for example, and which is formed with a pair of opposed, tubular, coolant flow nipples 18 and 19, and a central, outwardly-extending tubular cylindrical extension portion 20 defining a cylindrical interior flush water chamber 21. The housing member 17 is formed with a through bore 22 coaxial with and communicating between the coolant flow nipples 18, 19 for the through passage of cooling water from the sea during normal operation of the marine engine, as is hereinafter described. The housing member 17 is also formed with a bore 23 coaxial with the cylindrical extension portion 20 and of reduced diameter with respect thereto, thereby defining an annular shoulder 24 at the bottom of said cylindrical extension portion. The housing member 17 is also integrally formed with a comparatively short, outwardly-extending cylindrical boss 20a opposite the extension portion 20 and formed with a cylindrical bore 25 constituting a coaxial extension of the bore 23.

Slidably fitted within the cylindrical extension portion 20 and the bores 22, 23 and 25 of the T-shaped housing member 17 and the boss 20a is a tubular piston member 26, said tubular piston member comprising a cylindrical body portion 27 of such diameter as to be slidingly received within the bores 22, 23 and 25, and a short, annular head portion 28 at the outer end, of such increased external diameter as to be slidingly received along the interior wall defining the flush water chamber 21. A helical compression spring 29, circumjacent the body portion 27 of the tubular piston member 26, and constrained between the annular shoulder 30 of the head portion 28 thereof and the shoulder 24 within the housing member 17, normally holds said subular piston member in its outermost position, as illustrated by the full line representation thereof in FIG. 2.

Means is provided for constraining the tubular piston member 26 to relatively axial movement within the extension portion 20 of the housing 17. To this end, the interior wall of the extension portion 20 is formed with a straight longitudinal groove 31 received in which is a short pin 32 fixed with respect to the head portion 28 of the tubular piston member 26, and extending radially outwardly thereof. The lower or inner end of the body portion 27 of the tubular piston member 26 is closed off by a bottom wall 33. The side wall of the body portion 27 is formed, at a distance intermediate its ends, with a semicircular opening 34, said opening being so directed radially as to face the interior of the coolant flow nipple 19 through its associated bore when said piston member is in depressed position as indicated by the broken line representation thereof in FIG. 2.

The outer end of the extension portion 20 of the housing member 17 is exteriorly threaded, as indicated at 35, to receive an annular coupling flange 36 removably securing an interiorly threaded coupling nipple 37 against the outer end of said extension portion for connection thereto. A washer 38 of neoprene or a similar resilient material is preferably fitted between the outer end of the extension portion 20 and the inner end of the coupling nipple 37 to prevent leakage. The washer 38 serves as a stop to limit outward movement of the tubular piston member 26 under the influence of the compression spring 29.

In use, the flush valve 10 will be connected in series with the inlet conduit 11 leading to the inlet port of the water jacket of a marine engine, as described above and illustrated in FIG. 1, with the coolant flow nipple 19 extending in the flow path leading to the motor. As so installed, it will be understood that the semi-circular opening 34 of the tubular piston member 26 will be facing in the direction of inflow to the motor. FIGS. 2 and 3 illustrate the normal position of the tubular piston member 26 in full lines, it being in withdrawn position under the influence of the compression spring 29 to permit sea water to flow through the housing member bore 22 for circulation through the engine water jacket. When the boat is docked after a cruise, the sea water remaining within the engine block jacket can be flushed out simply by connecting a fresh water hose to the conveniently located hose connector 16. Upon turning on hose water, water pressure exerted against the bottom wall 33 of the tubular piston member 26 serves to depress said piston member to the position represented by the broken line piston thereof in FIG. 2, whereat the fresh water under pressure can flow through the opening 34 and coolant flow nipple 19 into the motor block water jacket for flushing out all sea water with fresh water in a matter of a few seconds. The resiliency of the compression spring 29 is such as will permit full depression of the tubular piston member 26 to the position represented by the broken line representation thereof in FIG. 2 under a wide range of water pressure. In such position the lower end of the tubular piston member 26 will be received within the bore 25 of the short extension portion 20a so as to cut off any flow of sea water through the coolant flow nipple 18. The distance between the bottom of the tubular piston member 26 and the lower end of the opening 34 is slightly greater than the diameter of the coolant flow nipple bore, so that sea water flow with the engine running will be completely cut off by any fresh water pressure capable of operating the device.

While I have illustrated and described herein only one form in which my invention can conveniently be embodied in practice, it is to be understood that this form is presented by way of example only and not in a limiting sense.

The invention, in brief, comprises all the embodiments and limitations coming within the scope and spirit of the following claims.

What I claim as new and desire to secure by Letters Patent is:

1. In a pressure actuated flush valve for flushing water-cooled engines, the combination comprising, a housing member having a first inlet port and an outlet port, an interior elongated passageway communicating between said inlet and outlet ports, a second inlet port in said housing member, an elongated interior chamber communicating between said second inlet port and said passageway and intersecting said passageway at an angle, a valve mechanism in said interior chamber, said valve mechanism being movable between unactuated and actuated positions within said interior chamber, said valve mechanism, when in unactuated position, being operative to close off the path of flow through said interior chamber into said passageway, said valve means being operative to be controlled by water pressure applied to said second port to move said valve mechanism to said actuated position for permitting water applied under pressure to said second port to flow through said outlet port, said valve means comprising means when actuated for simultaneously shutting off the path of flow through said passageway from said first inlet port, said interior chamber being cylindrical in shape, said valve mechanism comprising a tubular piston member reciprocably arranged in said interior chamber, said interior chamber in said passageway being perpendicularly arranged, said piston being formed with an annular head at its second inlet port end and a reduced diameter cylindrical body portion, said cylindrical interior chamber having a reduced-diameter passageway end portion within which said body portion is received.

2. A pressure actuated flush valve for flushing water-cooled engines comprising, in combination, a housing member having a first inlet port and an outlet port, an interior elongated passageway communicating between said inlet and outlet ports, a second inlet port in said housing member, an elongated interior chamber communicating between said second inlet port and said passageway and intersecting said passageway at an angle, a valve mechanism in said interior chamber, said valve mechanism being movable between unactuated and actuated positions within said interior chamber, said valve mechanism, when in unactuated position, being operative to close off the path of flow through said interior chamber into said passageway, said valve means being operative to be controlled by water pressure applied to said second port to move said valve mechanism to said actuated position for permitting water applied under pressure to said second port to flow through said outlet port, said valve means comprising means, when actuated, for simultaneously shutting off the path of flow through said passageway from said first inlet port, said interior chamber being cylindrical in shape, said valve mechanism comprising a tubular piston member reciprocably arranged in said interior chamber, said interior chamber and said passageway being substantially perpendicularly arranged, resilient means nomally constraining said piston member to the second inlet port end of said interior chamber, said tubular piston member being provided with a bottom wall at its passageway end and a side opening directed in the direction of said outlet opening and communicating therewith when said valve mechanism is in said actuated position.

3. A pressure-actuated flush valve for flushing water-cooled engines as defined in claim 2 and including a cylindrical bore in said housing member coaxial with said cylindrical interior chamber and communicating with the opposite side of said passageway for receiving the passageway of said piston member.

4. A pressure actuated flush valve for flushing water-cooled engines as defined in claim 3 and wherein said piston is formed with an annular head at its second inlet port end and a reduced-diameter cylindrical body portion, said cylindrical interior chamber having a reduced-diameter passageway end portion within which said body portion is received, said annular head and said reduced diameter passageway end portion of said chamber providing opposed annular shoulders, said resilient means comprising a helical compression spring circumjacent said body portion and constrained betwen said opposed shoulders.

5. A pressure actuated flush valve for flushing water-cooled engines as defined in claim 4 wherein the diameter defined by said reduced diameter passageway end of said cylindrical interior chamber and the diameter of said housing member bore are equal.

6. A pressure actuated flush valve for flushing water-cooled engines as defined in claim 5 wherein said passageway is in the form of a cylindrical bore equal in diameter to the diameter of said reduced diameter passageway end of said cylindrical interior chamber.

References Cited

UNITED STATES PATENTS

| | | | |
|---|---|---|---|
| 1,694,427 | 12/1928 | Nielsen | 137—111 X |
| 2,847,182 | 8/1958 | Mancusi | 251—332 |

LEONARD D. CHRISTIAN, *Primary Examiner.*

U.S. Cl. X.R.

251—332